United States Patent
Armstrong et al.

[11] Patent Number: 5,965,624
[45] Date of Patent: Oct. 12, 1999

[54] SELF PURGING EVOH COMPOSITIONS, AND METHODS

[75] Inventors: Robert Bruce Armstrong, Seabrook; Hidemasa Oda, Houston, both of Tex.

[73] Assignee: EVAL Company of America, Lisle, Ill.

[21] Appl. No.: 08/883,701

[22] Filed: Jun. 27, 1997

[51] Int. Cl.$^6$ ............ C08L 29/04; C08K 5/13; A61K 47/10

[52] U.S. Cl. ............ 514/772.4; 524/323; 524/226; 524/334

[58] Field of Search .................. 264/209.6, 211, 264/331.11; 524/323, 326, 334; 523/105; 514/772.4

[56] References Cited

U.S. PATENT DOCUMENTS

| | | | |
|---|---|---|---|
| 4,347,337 | 8/1982 | Knott, II | 524/337 |
| 4,938,759 | 7/1990 | Enscore et al. | 424/449 |
| 5,258,422 | 11/1993 | Chang et al. | 523/124 |
| 5,322,877 | 6/1994 | Moriyama et al. | 524/309 |

FOREIGN PATENT DOCUMENTS 9322125  11/1993  WIPO .............. 264/173.16

*Primary Examiner*—Peter F. Kulkosky
*Attorney, Agent, or Firm*—Thomas D. Wilhelm; Jerry F. Janssen; Michael L. Winkelman

[57] ABSTRACT

Polymer compositions of the invention typically comprise a base polymer composition, a polymer cleavage agent, and a stabilizer composition. The preferred base polymer composition comprises an ethylene vinyl alcohol copolymer composition. Preferred cleavage agent is an alkaline earth or transition metal salt, preferably an acetate, or a salt of an acid having 8 to 20 carbon atoms. The stabilizer composition comprises an alkylated phenol or bisphenol. Preferred stabilizer composition comprises a tocopherol, preferably alpha tocopherol.

16 Claims, 1 Drawing Sheet

SELF PURGING EVOH COMPOSITIONS, AND METHODS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND

This invention relates generally to self-purging ethylene vinyl alcohol (EVOH) compositions. While the principles of the invention can apply to a wide variety of self-purging EVOH compositions, the invention is described herein specifically with is respect to those self-purging compositions containing metal salts of acids. Accordingly, the principles described herein are not limited to polymer compositions containing metal salts, but are limited only by the operability of the principles disclosed herein with respect to odor and flavor suppression properties attendant the materials disclosed herein for controlling such properties.

EVOH resin is widely employed for, among other things and without limitation, food packaging and other applications as a gas and/or flavor barrier material. EVOH is usually extruded from a die in a single or multiple layer structure, and may thus be fabricated into a wide variety of shapes, such as films, sheets, or bottles.

Melted EVOH resin has a known affinity for metals, and thus tends to build up inside the extruder and downstream equipment (e.g. adapter, screens, and shaping die) of related polymer processing apparatus. EVOH is also quite sensitive to the time during which it is exposed to extruder-type temperatures. Namely, the "OH" moieties in EVOH tend to cross-link with each other.

The physical result is that, as a typical extrusion "run" progresses, viscosity of the EVOH extrudate gradually increases (MI decreases), while the amount of cross-linked EVOH builds up inside the extrusion and shaping equipment. As material continues to build up in the extrusion and shaping equipment, at some point the build-up is great enough that the material begins to break loose and show up in the extrudate as gels. The number of gels increases with time. Large numbers of gels are generally unacceptable in shaped products so made. Thus, the extruder must, from time-to-time, be purged (cleaned out) of the EVOH build-up.

One method for cleaning out the EVOH is to shut down, cool off, disassemble, and physically scrape/clean, etc. the extrusion equipment. A preferred method is to run through the extrusion and shaping equipment some material that will clean out the EVOH, including the build-up inside the respective equipment. Such material is generically known as a "purge" material, and the process is called "purging."

With EVOH, "purging" must be done periodically, even if the resin being extruded is always EVOH. Using conventional technology, the interval between "purgings" of EVOH is typically 1–7 days. The longer runs of up to 7 days require use of a self-purging EVOH resin. By self purging EVOH resin, we mean that the resin composition includes at least one component/additive which participates in a controlled amount of cleavage of the EVOH copolymer, normally by cleavage of the ethylene chain.

Typical such additives are metal salts of acids, for example, magnesium stearate. Such cleavage of the polymer chain can create short chain polymer segments, as well as oxygen-containing monomer molecules such as aldehydes and ketones, some of which have human-perceived odors and/or flavors.

This invention is directed toward improved self-purging EVOH copolymer compositions, methods of use of such self-purging copolymer compositions, and products made with such self-purging copolymer compositions.

It is an object of the invention to provide an EVOH copolymer composition providing improved control of odor and flavor.

It is a more specific object to provide a self-purging EVOH copolymer composition providing improved control of odor and flavor.

It is a further specific object to provide an EVOH copolymer composition comprising a phenol and/or bisphenol stabilizer.

It is a more specific object to provide an EVOH copolymer composition comprising a tocopherol stabilizer.

It is a still more specific object to provide an EVOH copolymer composition comprising an alpha tocopherol stabilizer.

It is yet another object to provide a method of effectively controlling odor and/or flavor in the extruded product.

It is still another object to provide a method of making an extended extrusion run of EVOH copolymer composition while effectively controlling odor and/or flavor in the extruded product.

SUMMARY

Some of the objects are obtained in improved self-purging EVOH copolymer compositions, single and multiple layer films and structures made from those compositions. Second and additional elements of such films and structures, to which the EVOH may be secured, including through adhesives and the like, are paper, non-wovens, glass, metal sheet, metal foil, and other polymers.

The invention further provides methods for melt processing EVOH copolymer compositions through polymer melt-processing apparatus. Other objects are obtained in methods of controlling odor and flavor derived from melt-processed EVOH copolymer compositions.

In general, a polymeric composition of the invention comprises a base polymer susceptible to cleavage, and a stabilizer composition comprising an alkylated phenol or bisphenol, such as a tocopherol, preferably an alpha tocopherol. One function of the stabilizer is to control human-perceived odor molecules and human-perceived flavor molecules in the base polymer, whatever its physical structure.

Polymeric compositions of the invention generally comprise at least one polymer cleavage (e.g. chain cleavage) agent. Typical polymer cleavage agents comprise metal salts of acids. In typical such metal salts, the respective metal is selected from alkaline earth metals and transition metals. When a metal salt is used, the metal salt composition is preferably present in the EVOH self-purging copolymer composition in amount of about 0.001 to about 1 weight percent, more preferably 0.002 to about 0.5 weight percent, still more preferably about 0.005 weight percent to about 0.05 weight percent.

Preferred metal in the metal salt may be an alkaline earth metal. Examples of certain ones of the preferred metals are selected from the group consisting of calcium, magnesium, manganese, and zinc, for example calcium stearate, magnesium stearate, manganese stearate, and zinc stearate. Preferred metal salts are derived from acetates, and from organic acids having between 8 and 20 carbon atoms.

The invention further contemplates melt-processed compositions of matter derived from the above combinations through melt-processing steps wherein the tocopherol has suppressed or otherwise controlled odor and/or flavor molecules, typically in combination with polymer cleavage.

The materials used in EVOH copolymer compositions of the invention are generally combined, and mixed at e.g. room temperature, to make the EVOH copolymer composition prior to melt processing of the resulting mixture. In the alternative, polymer cleavage and stabilizer materials can be prepared together or separate in concentrates and/or masterbatches, and thereby prepared as pellets or the like, which are then mixed with pellets of the EVOH copolymer resin prior to extrusion. In any event, the various materials used in EVOH copolymer compositions of the invention are combined with each other no later than in the melt-processing extruder. Various conventional methods of so combining the respective materials are well known, and are suitable for use herein. Those skilled in the art can select the proper combining and mixing methods based on the respective materials being used.

Figure 1:
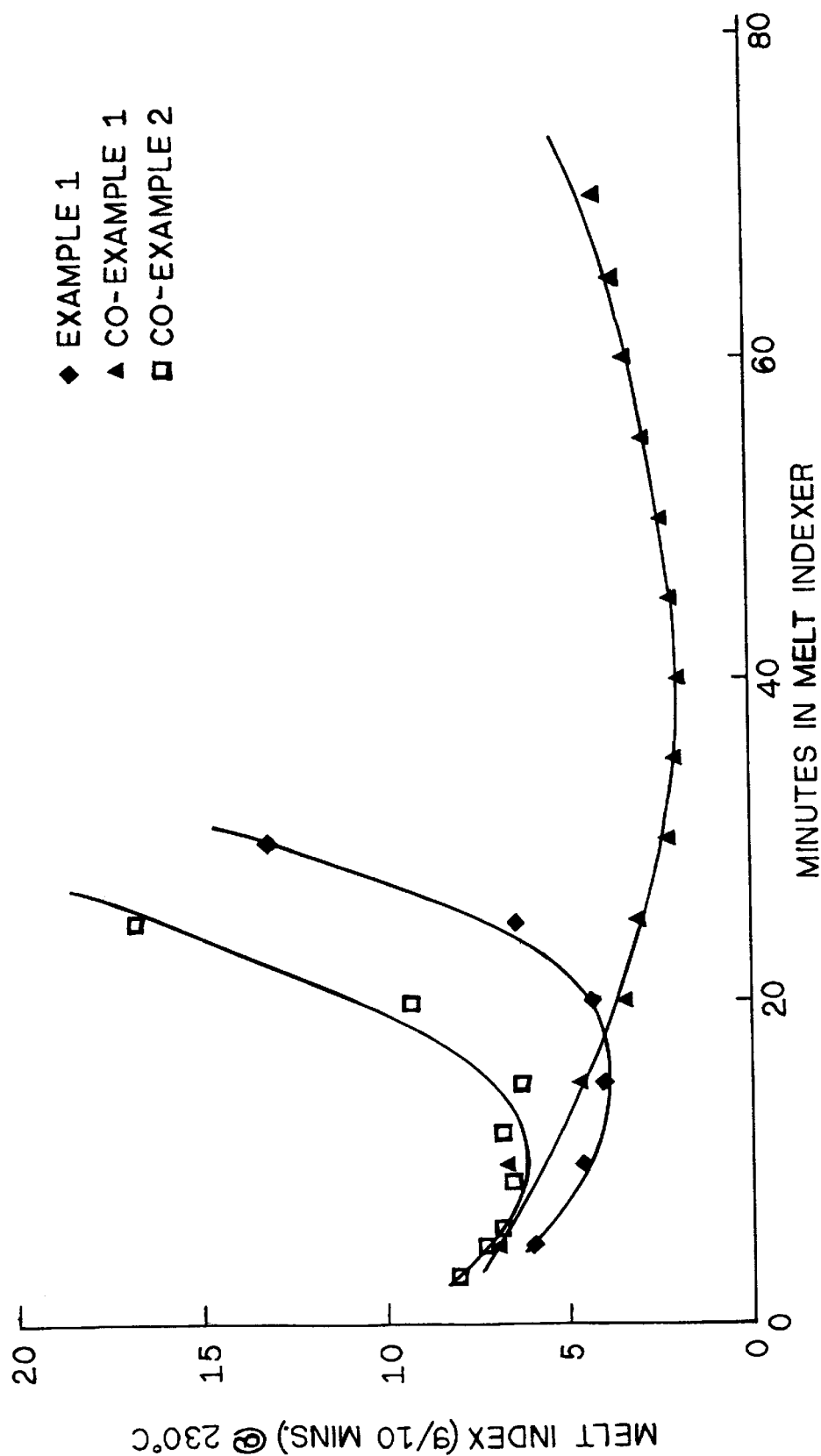
FIG. 1 is a graphical representation of Melt Index over Time for EVOH copolymer compositions.

The invention is not limited in its application to the details of construction and the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

This invention is directed toward melt-processing, especially extruding, ethylene vinyl alcohol copolymer compositions, and thereby molding or otherwise shaping a product therewith, and self-purging the extrusion apparatus on an ongoing basis during the extrusion run. The invention is specifically directed toward improved self-purging EVOH copolymer compositions, and toward the overall concept of improving the performance of self-purging EVOH resins/compositions, such that the overall performance of the self-purging resin is improved.

In general, self-purging resins/copolymer compositions are used to reduce the frequency with which such EVOH extrusion runs must be stopped for purging of the extrusion apparatus, or shut down and dissembled for hand cleaning.

In general, cleaning/purge material is a second polymer composition, different from the copolymer composition which is desirably being shaped into product. When a purge step is to be performed, the operator stops feeding the EVOH material to the extruder hopper. When the EVOH level in the extruder hopper is sufficiently low, the operator adds the purge material to the hopper. As a result, there is little mixing of the EVOH and purge materials in the hopper. The purge material then enters the melt processing operation of the extruder, and passes through the extruder and other extrusion apparatus immediately behind trailing elements of the EVOH, driving and otherwise cleaning the EVOH from the extrusion processing apparatus. In general, the purge material is processed through the polymer processing apparatus without stoppage of the processing operation (e.g. without stoppage of the turning of the extruder screw).

Upon completion of the purging/cleaning, the processing apparatus is desirably so thoroughly cleaned that a following third polymer composition can be introduced into the processing apparatus directly behind the purge material, and the third polymer composition processed into molded product with reduced incidence of gels and other imperfections such that acceptable product is readily produced therewith. The result of such effective purging is to at least temporarily maintain uninterrupted operation of the polymer processing apparatus to further produce usable product.

It will be understood by those skilled in the art that all such polymer processing apparatus is periodically shut down for manual cleaning. Periodically running purge material through the extrusion apparatus is one known tool for extending the time between shut-downs. Using self-purging EVOH compositions in the main extrusion run is a second known tool for extending the time between shut-downs. It is also known to periodically employ purging materials in an extrusion run which employs a self-purging EVOH.

The difficulty with using purging materials to clean the extrusion apparatus while temporarily withdrawing the EVOH from the extrusion apparatus is that purging interrupts the production process. The problem with using self-purging EVOH resin composition is that, in some cases, such resins are known to give off odors, and to transfer odor and flavor to products which contact such melt-processed EVOH materials. Using self-purging EVOH resin composition of the invention, the overall efficiency of the EVOH extrusion operation is improved, while human-perceived incidents of odor and flavor sensations derived from such molded and/or shaped EVOH compositions are reduced.

Typical self-purging EVOH copolymer compositions of the invention generally comprise a base polymer, a polymer cleavage agent, and a stabilizer.

EVOH suitable for use with respect to the present invention can be prepared by the methods disclosed in, for example, U.S. Pat. Nos. 3,510,464; 3,560,461; 3,585,177; and 3,847,845. In general, EVOH is hydrolyzed ethylene vinyl acetate copolymer, also referred to as saponified ethylene vinyl acetate copolymer.

The degree of hydrolysis of the EVOH should be more than 85 mole percent, preferably more than 95 mole percent. The EVOH preferably contains about 15 mole percent to about 70 mole percent ethylene moieties, and respectively about 30 mole percent to about 85 mole percent vinyl alcohol moieties. Copolymers having less than 15 mole percent ethylene tend to be difficult to extrude, while those having greater than 70 mole percent ethylene have reduced oxygen barrier performance.

EVOH copolymers suitable for the present invention are commercially available from e.g. EVAL Company of America, Lisle, Ill. (EVALCA), and Kuraray of Japan. EVALCA produces, for example, and without limitation, an ethylene vinyl alcohol copolymer under the designation "LC-H" which has 36 mole percent to 40 mole percent ethylene, melt index of about 1.6, and melting point of 175 degrees C.

Other manufacturers produce suitable EVOH raw materials useful in making self-purging EVOH copolymer compositions of this invention. One such suitable EVOH copolymer has about 29 mole percent ethylene, a number average molecular weight of about 22,000 and a melting point of 186 degrees C. Another suitable EVOH copolymer, described in U.S. Pat. No. 4,252,169 has 40 mole percent ethylene, a number average molecular weight of about 26000 and a melting point of 172 degrees C.

The number average molecular weight can be measured by osmometry. The EVOH may have any melt index (210 degrees C. load 2160 grams) but generally the melt index is from about 0.5 to about 50 grams/10 minutes.

The EVOH referred to herein includes embodiments of EVOH copolymer wherein the EVOH has been modified with a small amount, for example about 0.1 mole percent to about 10 mole percent of a modifying monomer copolymerizable with ethylene vinyl alcohol copolymer. Examples of the modifying monomer are vinyl silane propylene, 1-butene, 1-hexene, 4-methyl-1-pentene, acrylates, methacrylates, maleic acid, phthalic acid, itaconic acid, higher aliphatic acids, vinyl esters, alkyl vinyl ethers, N vinyl pyrrolidone, N-n-butoxymethylacrylamide, N-(2-dimethylaminoethyl) methacrylamide, and quaternary compounds thereof and N-vinylimidazole and quaternary compounds thereof. As used herein, including in the claims which follow, the expressions "ethylene vinyl alcohol" and "EVOH" include material having such copolymerized monomer therein.

EVOH copolymer may contain alkaline metal or salt of alkaline metal as a carryover from the saponification step in producing the EVOH copolymer. Such alkaline metal or salt of alkaline metal is not effective to provide sufficient polymer cleavage required in self-purging EVOH copolymers. Accordingly, for purposes of defining a polymer cleavage agent, the presence of alkaline metal in the EVOH is not considered, and alkaline modification is not considered to be relevant to polymer cleavage reactions of the invention.

The EVOH may also comprise a combination of two or more EVOH materials having e.g. different ethylene content and/or degree of saponification.

In general, as the EVOH extrusion proceeds, "OH" moieties in the EVOH react with each other to cross-link the carbon chains of the EVOH polymer in the extrusion processing equipment. As the EVOH cross-links, the molecular weight increases, along with corresponding increase in viscosity and decrease in melt index. In addition, EVOH polymer, primarily cross-linked EVOH polymer deposits on the interior surfaces of the extrusion processing apparatus. Overall then, the molecular weight and viscosity of the EVOH coming out of the die tend to increase with time, while the melt index respectively declines.

As a practical matter, the rate of flow of EVOH through the extruder gradually declines, the through-put declines, and power consumption to turn the extruder screw goes up. Where no provision is made to counter such cross-linking, the time over which the EVOH can be extruded through the extruder without purging or shut down is typically measured in hours, and no more than 2 days. If purge materials are periodically processed through the extruder, the extrusion run can be extended to a few days, albeit with the cost and lost production time attendant such purgings.

The role of self-purging EVOH copolymer compositions is to counter the cross-linking of the EVOH by introducing into the EVOH composition a material which will operate in the melt processing environment to cause a limited amount of breaking down of the EVOH polymer (tending to reduce molecular weight) at the same time that the cross-linking is contributing to increase in molecular weight. In principle, if the controlled break-down can be caused to occur at the same rate as the build-up through cross-linking, the net result should be no net change in molecular weight, and thus no build-up of high molecular weight material inside the extrusion apparatus.

At least some of the polymer cleavage agents disclosed here are known as cleavage agents. When such agents cleave the polymer, a variety of materials are formed, including fragments still recognizable as polymers having the same general range of molecular weight as the EVOH polymer from which they were derived, a variety of lower molecular weight polymers, and a variety of monomeric molecular moieties. Such cleavage of the polymer is accompanied by at least a modest level of oxidation of various of the polymer moieties, in creating the reaction products of such cleavage. Exemplary monomer molecular moieties so produced may include, for example, aldehydes and ketones, along with other oxygenated chemicals. Some of the above reaction products have human-perceived odors and/or flavors.

Accordingly, one of the negative aspects of conventional self-purging EVOH compositions is the incidence of transfer of odor and/or flavor components to products which come into contact with such melt-processed EVOH compositions. This factor is especially important in view of the fact that EVOH is commonly used in food and beverage packaging.

So while the polymer cleavage agent is important to enabling longer extrusion runs of EVOH, such cleaving of the polymer creates a variety of reaction products which are detrimental to the primary utility of EVOH as e.g. a packaging product.

Keeping in mind the above, a polymer cleavage agent used in self-purging EVOH copolymer compositions of the invention is preferably a metal salt of an acid. In general, the metal salt can be derived from a wide variety of acids. The metal salt is preferably derived from either acetic acid (acetate salt) or salt of an organic acid having 8 to 20 carbon atoms. The metal is an alkaline earth or transition metal.

Without limitation, preferred metals are calcium, magnesium, manganese, and zinc. Examples of the metal salts are, without limitation, metallic fatty acid salts such as magnesium stearate, calcium stearate, zinc stearate, and manganese stearate, other salts of stearic acid; including salts of stearic acids containing magnesium or other metals in the monovalent form. A highly suitable, commercially available, form of stearic acid suitable for the present invention, is powdered magnesium stearate containing approximately 7.5% magnesium ion, which is available from American International Chemical Company, Natick, Mass.

Where metal salt of acid is used as the polymer cleavage agent, the metal salt is used in amount of about 0.001 to about 1 weight percent, preferably about 0.002 weight percent to about 0.5 weight percent, more preferably about 0.05 weight percent to about 0.5 weight percent, of the overall EVOH copolymer composition.

In EVOH copolymer compositions of the invention, a stabilizer composition is combined with, and mixed with, the EVOH copolymer and the cleavage agent. Preferably both the cleavage agent and the phenol or bisphenol stabilizer composition, and other additives as desired, are mixed with the EVOH and are dry blended with the EVOH before the resulting composition is melt processed. Alternatively, some or all of the additives can be compounded into a masterbatch concentrate, using e.g. a polyethylene carrier polymer, and produced as concentrate pellets. The concentrate pellets are then dry blended with the EVOH pellets before melt processing the resulting mechanically mixed composition.

The stabilizer composition comprises an alkylated phenol or bisphenol. Preferred stabilizer composition is a tocopherol, more preferably an alpha tocopherol. A suitable such material is 2,5,7,8-tetraMe-2-(4',8',12'-triMe-tridecyl)-6-chromanol, illustrated by the following structure

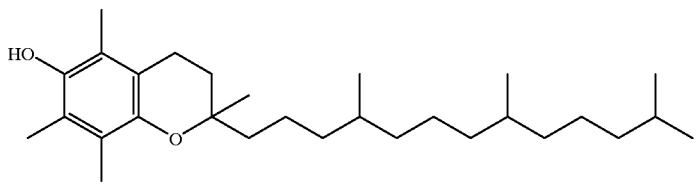

Alpha tocopherol is available as a generally pure liquid, and may be incorporated into the EVOH by melt blending, or may be provided as a concentrate incorporated into another resin such as polyethylene, or may otherwise be incorporated into the composition being processed through the extrusion processing apparatus.

The stabilizer composition is incorporated into the EVOH copolymer composition in amount of about 0.001 part to about 0.1 part, preferably 0.002 part to 0.01 part, by weight based on 100 parts by weight of EVOH.

While choosing to not be bound by theory, applicants contemplate that incorporation of the polymer cleavage agent causes the polymer cleavage effect previously discussed, proportional to the quantity of cleavage agent incorporated into the EVOH composition. Cleavage typically comprises chain scission and other bond breakages caused by the cleavage agent in the presence of the heat and shear energy extant in the extrusion processing apparatus, thereby releasing free radicals which can react with other polymer molecules, or react with oxygen in air or form oxygen containing low molecular weight compounds such as the above mentioned aldehydes and ketones. Such compounds may be entrapped in the polymer matrix, may evaporate into the air, or may migrate to package products such as food and/or beverage, producing human-perceived flavors and/or odors.

Still operating on theory, and not to be bound thereby, applicants contemplate that alpha tocopherol is oxidized to a tocoopherxyl radical and then regenerated by a reducing agent such as, for example, ascorbic acid. Thus, the alpha tocopherol was expected to terminate, or at least greatly interfere with, the cleavage affect of the polymer cleavage agent, thus to inhibit the self-purging property of self-purging EVOH polymer.

Surprisingly, as discussed hereinafter, alpha tocopherol effectively reduces human-perceived odor and flavor in melt-processed self-purging EVOH resins while the polymer cleavage property proceeds generally little affected. While the mechanism is not clearly known, applicants contemplate that the stabilizer composition is preferentially attracted to free radicals generated by the polymer cleavage agent, rather than to the cleavage agent, itself. Under that scenario, the stabilizer composition generally has less interaction with the cleavage agent, and reacts actively with the free radicals generated by the reactions of the cleavage agent with the polymer molecules.

Whatever the mechanism, stabilizer compositions of the invention are effective to reduce the incidence of human-perceived flavor molecules and odor molecules in melt-processed EVOH copolymer compositions of the invention.

In preferred embodiments including both a polymer cleavage agent and a stabilizer composition, the time for the melt index of the EVOH composition to double was 30 minutes, while for a comparable composition having only the cleavage agent and not the e.g. tocopherol stabilizer, the time to double the melt index was 25 minutes. The close relationship in the times for doubling the melt index demonstrates that the self purging property of the EVOH composition was essentially preserved.

Virgin EVOH has low volatile emission under elevated temperature and was overall preferred by panelists with respect to smell and flavor. However, virgin EVOH, namely EVOH having no cleavage agent and devoid of the stabilizer compositions disclosed herein, quickly increases in viscosity during e.g. an extrusion run, whereby duration of the extrusion run is quite limited.

Volatile loss from the combination of EVOH and the cleavage agent was over 10 times higher than that for pure virgin EVOH. EVOH composition of the invention, containing both the cleavage agent and the phenol or bisphenol stabilizer composition, had 25% less volatiles loss, and was preferred by test panelists in smell and flavor tests, compared to EVOH having cleavage agent but devoid of the stabilizer composition.

While alpha tocopherol (a Vitamin E) is a preferred stabilizer, other tocopherols, Vitamin B's, and Vitamin K's, though less preferred, are contemplated as being acceptable stabilizers.

Polymer processing apparatus specifically contemplated herein includes, without limitation, an extruder, adapter, screens, and die. Other devices typically used with such extrusion apparatus is, of course, included. Further, as used herein, polymer processing apparatus includes other apparatus, such as mixers, used to process polymer compositions. Thus, this invention can be used with any apparatus useful to process polymer compositions, especially polymer melt compositions, and is not limited to extrusion processing apparatus, though such is contemplated as the primary use of the invention.

Methods of the invention can be practiced using extruding or other shaping steps as generally practiced in the art, using the EVOH compositions of the invention. The extrusion and other shaping apparatus utilized in such methods can be virtually any apparatus known for successful processing of EVOH copolymer compositions. Similarly, the extrusion processing steps can be virtually any extrusion processing steps known for successful processing of EVOH. Such apparatus and processing steps contemplate, without limitation, single layer or multiple layer extrusions of cast film or sheet, blown film, extrusion coating, or other single or multiple layer extruded structures. The most preferred method of such extrusion of EVOH to make a multiple layer film is coextrusion, including coextrusion of pipe using a multiple manifold circular die.

Coextrusion processes useful to form multiple layer structures, including multiple layer films, are generally known as indicated in, for example, "Modern Plastics Encyclopedia" Volume 56, No. 10A, pages 131–132, McGraw Hill, October, 1979. For example, an EVOH copolymer composition is extruded through a first extruder, a second polymer composition is simultaneously extruded through a second extruder, and the resulting melt streams from the respective first and second extruders are combined and simultaneously expressed from a common die to thereby make a multiple layer product, such as sheet or film, having at least first and second polymer compositions, typically as separate first and second layers.

It is contemplated that the operation and functions of the invention have become fully apparent from the foregoing description of elements and their cooperations with each other, but for completeness of disclosure the usage of the invention will be briefly described.

A typical extrusion sequence, for extruding self-purging EVOH copolymer composition from an extruder is as follows. The relevant EVOH copolymer composition is placed in the extruder hopper and fed into and through the extruder in the usual manner. As the extrusion run proceeds, the polymer cleavage agent in the EVOH copolymer composition reacts with the EVOH copolymer, cleaving the copolymer, and thereby providing limited control of the melt index and viscosity of the polymer composition for a time longer than would be obtainable absent the polymer cleavage agent. At some point, the self-purging property of the self-purging EVOH composition is overcome by the tendency of the EVOH to self-cross-link, such that the ability of the polymer cleavage agent to control the polymer viscosity is no longer effective to enable continued extrusion of the EVOH polymer composition.

At that point, the user may either use a purging material to purge the extrusion and shaping apparatus, or may shut down and disassemble the extrusion and shaping apparatus, for hand cleaning.

Referring to the purging process, a typical amount of purge material is 6 to 50 times the volume of the melt channel, the extruder, the adapter, and the die. During the purging process, the screw speed may be adjusted as needed to accommodate transport and processing of the purge material through the extrusion processing apparatus. Similarly, temperatures at the several locations along the processing line in the extrusion apparatus may be adjusted to accommodate efficient transport and operation of the purge material through the processing system. Generally, the temperature is the same as the previous temperatures when EVOH was being processed, or higher.

After suitable quantity of the purge material has been run through the processing system, the EVOH should be effectively purged thereby from the processing apparatus. Once the EVOH is effectively purged from the processing apparatus, any polymer suitable for extrusion through that particular equipment assemblage may be introduced into the extruder, and processed to make molded product therefrom.

In the alternative, once the EVOH has been effectively purged from the extrusion processing apparatus, the system can be shut down with the purge material in the system. Upon start-up, the system can be operated taking into account only the presence of the purge material, and without any consideration of the previous use of EVOH in the system.

In the Examples which follow, property measurements were made as follows.

Melt Index Change Over Time

Melt Index change over time, or self purging characteristics measurements of unmodified and modified EVOH polymer compositions was conducted in a standard melt indexer conforming to ASTM standards. (Tinus Olsen A987). Measurement temperature was 230 degrees C. Load weight was 2160 grams. Sample size was 4 grams±0.1 gram. Melt Index change over time held at 230 degrees C. was measured at set intervals.

Volatiles Generation 10 gram samples of unmodified and modified EVOH copolymer composition were dried at 105 degrees C. for 24 hours and were measured into dry aluminum pans. The weight of the sample was recorded, to accuracy of 0.001 gram. The sample was then held at 230 degrees C. under air for 4 hours. Sample weight was again measured. Weight loss was calculated as a percent of the original weight of the sample.

Odor Tests

Samples for odor evaluation were prepared by placing 50 grams of each sample into a sealed test tube flushed with nitrogen gas, and heating the sample at 190 degrees C. for 30 minutes. The samples were then cooled. Five test panelists evaluated intensity of odor emanating from each sample. The results shown are the averages of the responses of the 5 panelists.

Flavor Tests

Samples of EVOH solution for flavor evaluation were prepared by placing 400 ml of distilled and deionized water in 500 ml boiling flasks, adding 100 grams of EVOH samples to each flask and then heating the flasks to 100 degrees C. in a water bath. The flasks were held at 100 degrees C. for 60 minutes. The flasks were then removed from the water bath, cooled in cold water for 30 minutes, sealed and stored at 5 degrees C. Five test panelists evaluated type and intensity of flavor of each sample. The results shown are the averages of the responses of the 5 panelists.

EXAMPLE 1

EVAL® LC-H101 self-purging EVOH copolymer (38 mole percent ethylene, melt index 1.6 g/10 min), made by EVALCA, magnesium stearate from American International Chemicals Company of Natick, Mass., and alpha tocopherol from Roche Chemicals, Nutley, N.J., were mixed in the proportions of 99.958 weight percent EVOH, 0.012 weight percent magnesium stearate, and 0.03% alpha tocopherol, using a 20 mm Toyo Seiki Labo Plastomill (Model 20R200) at a melt temperature of about 220 degrees C. and 40 rpm, pelletized, and dried. After drying the pelletized composition with hot air for 24 hours at 105 degrees C., the properties of melt index change over time, volatile loss, off flavor, and odor, were evaluated. The overall result indicated effective and operable degradability by e.g. polymer cleavage, in combination with reduced volatiles loss, lower odor, and less off flavor. The results are shown numerically in Table 1 and FIG. 1.

COMPARATIVE EXAMPLE 1

Example 1 was repeated except that the magnesium stearate and alpha tocopherol were omitted. The results, shown in Table 1 and FIG. 1, indicate lower, unsatisfactory volatiles loss, and corresponding increased, and unsatisfactory, time to double melt index, presumably due to decreased incidence of polymer cleavage.

COMPARATIVE EXAMPLE 2

Example 1 was repeated except that the alpha tocopherol was omitted. The results, shown in Table 1 and FIG. 1, indicate high volatiles loss, and most offensive or intense odor or flavor.

COMPARATIVE EXAMPLE 3

Example 1 was repeated except that the magnesium stearate was omitted. The results, shown in Table 1 and FIG. 1, indicate lower, unsatisfactory volatiles loss, and corresponding increased, and unsatisfactory, time to double melt index, presumably due to decreased incidence of polymer cleavage.

TABLE 1

| Ex  | EVOH Wt % | Mg Stear Wt % | α-Tocoph Wt % | Time to Double MI | Weight Loss % | Odor | Flavor |
|-----|-----------|---------------|---------------|-------------------|---------------|------|--------|
| 1   | 99.958    | 0.012         | 0.03          | 30                | 16.7          | 2    | 2      |
| CE1 | 100       | -0-           | -0-           | >70               | 1.8           | 3    | 3      |
| CE2 | 99.988    | 0.012         | -0-           | 25                | 21.9          | 1    | 1      |
| CE3 | 99.97     | -0-           | 0.03          | >70               | 2.3           | 3    | 3      |

For odor and flavor tests,
1 = Most offensive/intense odor or flavor
3 = Least offensive/intense odor or flavor Table 2 shows numerically the results of the Melt Index Change Test. FIG. 1 shows the same information in graphical form.

TABLE 2

| Time (min) | Example 1 MI (g/10 min) | Co-example 1 MI (g/10 min) | Co-example 2 MI (g/10 min) | Co-example 3 MI (g/10 min) |
|------------|-------------------------|----------------------------|----------------------------|----------------------------|
| 3          | —                       | —                          | 8.00                       | —                          |
| 5          | 5.96                    | 6.9                        | 7.26                       | 6.99                       |
| 6          | —                       | —                          | 6.79                       | —                          |
| 9          | —                       | —                          | 6.51                       | —                          |
| 10         | 4.61                    | 6.66                       | —                          | 6.10                       |
| 12         | —                       | —                          | 6.76                       | —                          |
| 15         | 4.05                    | 4.69                       | 6.23                       | 5.34                       |
| 20         | 4.29                    | 3.45                       | 9.27                       | 4.52                       |
| 25         | 6.35                    | 3.13                       | 16.72                      | 3.72                       |
| 30         | 13.1                    | 2.20                       | —                          | 3.01                       |
| 35         | —                       | 2.05                       | —                          | 2.62                       |
| 40         | —                       | 1.94                       | —                          | 2.34                       |
| 45         | —                       | 2.14                       | —                          | 2.15                       |
| 50         | —                       | 2.38                       | —                          | 2.11                       |
| 55         | —                       | 2.85                       | —                          | 2.1                        |
| 60         | —                       | 3.33                       | —                          | 2.09                       |
| 65         | —                       | 3.62                       | —                          | —                          |
| 70         | —                       | 4.12                       | —                          | —                          |

The invention is not limited in its application to the details of construction and the arrangement of the components set forth in the above description. The invention is capable of additional embodiments or of being practiced or carried out in various ways not specifically disclosed herein. Also, it is to be understood that the terminology and phraseology employed herein is for purpose of description and illustration and should not be regarded as limiting.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A structure comprising a first layer of a material obtained from:
   (a) a base polymer composition comprising an ethylene vinyl alcohol copolymer, optionally containing less about 10 mole percent of a monomer copolymerizable with ethylene vinyl alcohol copolymer, the base polymer composition being susceptible to cleavage at polymer melt processing conditions;
   (b) a polymer cleavage agent, selected from the group consisting of metal salts derived from acetic acid, metal salt derived from organic acids having 8 to 20 carbon atoms and combinations thereof, wherein the metal in the metal salt is selected from the group consisting of alkaline earth metals, transition metals and combinations thereof, effective to cleave said base polymer; and
   (c) a stabilizer composition comprising at least one stabilizer material selected from the group consisting of alkylated phenols and bisphenols,
   wherein the time needed to double a first layer material melt index is less than the time needed to double a base polymer composition melt index under identical melt-processing conditions and the first layer material has reduced odor compared to a base polymer composition containing only the polymer cleavage agent.

2. A structure as in claim 1 wherein said polymer cleavage agent is present in said first layer in an amount of about 0.001 weight percent to about 1 weight percent, based on total weight of said structure.

3. A structure as in claim 1 wherein the respective metal is selected from the group consisting of alkaline earth metals and transition metals.

4. A structure as in claim 1 wherein the metal in said metal salt composition is selected from the group consisting of calcium, magnesium, manganese, and zinc.

5. A structure as in claim 1 wherein said metal salt is selected from the group consisting of calcium stearate, magnesium stearate, manganese stearate, and zinc stearate.

6. A structure as in claim 1 wherein said at least one stabilizer material comprises a tocopherol.

7. A structure as in claim 1 wherein said polymer cleavage agent comprises a metal salt composition of acid, the metal in said metal salt being selected from the group consisting of calcium, magnesium, manganese, and zinc, and wherein said stabilizer material comprises a tocopherol.

8. A structure as in claim 1 wherein said polymer cleavage agent comprises magnesium stearate, and wherein said stabilizer material comprises alpha tocopherol.

9. A composition of matter comprising a melt-processed material, obtained from:
   (a) a base polymer composition comprising an ethylene vinyl alcohol copolymer, optionally containing less about 10 mole percent of a monomer copolymerizable with ethylene vinyl alcohol copolymer, the base polymer composition being susceptible to cleavage at polymer melt processing conditions;
   (b) a polymer cleavage agent, selected from the group consisting of metal salts derived from acetic acid, metal salts derived from organic acids having 8 to 20 carbon atoms and combinations thereof, wherein the metal in the metal salt is selected from the group consisting of alkaline earth metals, transition metals and combinations thereof, effective to cleave said base polymer; and
   (c) a stabilizer composition comprising at least one stabilizer material selected from the group consisting of alkylated phenols and bisphenols, wherein the time needed to double a melt-processed material melt index is less than the time needed to double a base polymer composition melt index under identical melt-processing conditions and the melt-processed material has reduced odor compared to a base polymer composition containing only the polymer cleavage agent.

10. A composition of matter as in claim 9 wherein said polymer cleavage agent is present in an amount of about 0.001 weight percent to about 1 weight percent, based on total weight of said composition.

11. A composition of matter as in claim 9 wherein the respective metal is selected from the group consisting of alkaline earth metals and transition metals.

12. A composition of matter as in claim 11 wherein the metal in said metal salt composition is selected from the group consisting of calcium, magnesium, manganese, and zinc.

13. A composition of matter as in claim 12 wherein said metal salt is selected from the group consisting of calcium stearate, magnesium stearate, manganese stearate, and zinc stearate.

14. A composition of matter as in claim 9 wherein said at least one stabilizer material comprises a tocopherol.

15. A composition of matter as in claim 9 wherein said polymer cleavage agent comprises a metal salt composition of acid, the metal in said metal salt being selected from the group consisting of calcium, magnesium, manganese, and zinc, and wherein said stabilizer material comprises a tocopherol.

16. A composition of matter as in claim 9 wherein said polymer cleavage agent comprises magnesium stearate, and wherein said stabilizer material comprises alpha tocopherol.

* * * * *